US012373499B2

(12) United States Patent
Klein et al.

(10) Patent No.: US 12,373,499 B2
(45) Date of Patent: *Jul. 29, 2025

(54) SYSTEM TO MANAGE DOCUMENT WORKFLOWS

(71) Applicant: Palantir Technologies Inc., Denver, CO (US)

(72) Inventors: Nathaniel Klein, Washington, DC (US); Huanqi Deng, Annandale, VA (US); Kevin Whelan, Palo Alto, CA (US); Matthew LeVan, Arlington, VA (US); Takashi Okamoto, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,898

(22) Filed: Feb. 8, 2024

(65) Prior Publication Data

US 2024/0241912 A1 Jul. 18, 2024

Related U.S. Application Data

(63) Continuation of application No. 17/063,993, filed on Oct. 6, 2020, now Pat. No. 11,928,164, which is a (Continued)

(51) Int. Cl.
*G06F 16/00* (2019.01)
*G06F 16/22* (2019.01)
(Continued)

(52) U.S. Cl.
CPC .......... *G06F 16/93* (2019.01); *G06F 16/2272* (2019.01); *G06F 16/951* (2019.01); *G06F 3/04842* (2013.01); *H04L 67/01* (2022.05)

(58) Field of Classification Search
CPC .... G06F 16/93; G06F 16/2272; G06F 16/951; G06F 3/04842; H04L 67/42
(Continued)

(56) References Cited

U.S. PATENT DOCUMENTS 5,568,390 A 10/1996 Hirota et al.
5,857,329 A 1/1999 Bigham
(Continued)

FOREIGN PATENT DOCUMENTS

EP 0652513 A1 5/1995
EP 1564666 A1 8/2005
(Continued)

OTHER PUBLICATIONS

"U.S. Appl. No. 15/800,856, First Action Interview—Office Action Summary mailed Jan. 31, 2020".
(Continued)

*Primary Examiner* — Monica M Pyo
(74) *Attorney, Agent, or Firm* — Faegre Drinker Biddle & Reath LLP

(57) ABSTRACT

Example embodiments relate to a network-based workflow system, employed for receiving workflows, defining one or more data-object types based on the workflows, generating data-objects, assigning a workflow from among the one or more workflows to the data-object, and managing the data-object through various states of based on the workflow. As discussed, a "workflow" refers to orchestrated and repeatable patterns enabled by a systematic organization of resources into processes that transform and modify presentations of data-objects based on corresponding data-object states. A workflow may therefore comprise a set of states, wherein each state is linked to another state by one or more transitions, and wherein the transitions are associated with a set of events which may occur at each state.

17 Claims, 10 Drawing Sheets

Related U.S. Application Data continuation of application No. 15/800,856, filed on Nov. 1, 2017, now Pat. No. 10,839,022.

(60) Provisional application No. 62/536,298, filed on Jul. 24, 2017.

(51) Int. Cl.
*G06F 16/93* (2019.01)
*G06F 16/951* (2019.01)
*G06F 3/04842* (2022.01)
*H04L 67/01* (2022.01)

(58) Field of Classification Search
USPC .......................................................... 707/608
See application file for complete search history.

(56) References Cited

U.S. PATENT DOCUMENTS

| | | | |
|---|---|---|---|
| 5,902,349 | A | 5/1999 | Endo et al. |
| 6,496,774 | B1 | 12/2002 | Davies |
| 6,608,559 | B1 | 8/2003 | Lemelson et al. |
| 7,603,229 | B2 | 10/2009 | Goldberg et al. |
| 7,818,291 | B2 | 10/2010 | Ferguson et al. |
| 7,941,321 | B2 | 5/2011 | Greenstein et al. |
| 8,042,110 | B1 | 10/2011 | Kawahara et al. |
| 8,046,283 | B2 | 10/2011 | Burns et al. |
| 8,108,138 | B2 | 1/2012 | Bruce et al. |
| 8,352,174 | B2 | 1/2013 | Milstein et al. |
| 8,417,409 | B2 | 4/2013 | Bast et al. |
| 8,732,574 | B2 | 5/2014 | Burr et al. |
| 8,763,078 | B1 | 6/2014 | Castellucci et al. |
| 8,786,605 | B1 | 7/2014 | Curtis et al. |
| 8,819,620 | B1 | 8/2014 | Volchegursky et al. |
| 8,868,537 | B1 | 10/2014 | Colgrove et al. |
| 8,909,597 | B2 * | 12/2014 | Aymeloglu ........... G06F 40/279 715/204 |
| 9,092,482 | B2 | 7/2015 | Harris et al. |
| 9,280,532 | B2 | 3/2016 | Cicerone |
| 10,839,022 | B1 | 11/2020 | Klein et al. |
| 2002/0178252 | A1 | 11/2002 | Balabhadrapatruni et al. |
| 2003/0074090 | A1 | 4/2003 | Becka et al. |
| 2004/0153418 | A1 | 8/2004 | Hanweck |
| 2004/0172445 | A1 | 9/2004 | Singh et al. |
| 2004/0205572 | A1 | 10/2004 | Fields et al. |
| 2006/0074860 | A1 | 4/2006 | Ishiguro et al. |
| 2006/0230032 | A1 | 10/2006 | Brankov et al. |
| 2006/0241856 | A1 | 10/2006 | Cobleigh et al. |
| 2007/0088596 | A1 | 4/2007 | Berkelhamer et al. |
| 2007/0112629 | A1 | 5/2007 | Sanabria et al. |
| 2007/0156888 | A1 | 7/2007 | Hilerio et al. |
| 2007/0185826 | A1 | 8/2007 | Brice et al. |
| 2007/0198571 | A1 | 8/2007 | Ferguson et al. |
| 2007/0220604 | A1 | 9/2007 | Long |
| 2007/0282657 | A1 | 12/2007 | Hupfer et al. |
| 2008/0201333 | A1 | 8/2008 | Rowley |
| 2008/0301559 | A1 | 12/2008 | Martinsen et al. |
| 2008/0313281 | A1 | 12/2008 | Scheidl et al. |
| 2009/0037912 | A1 | 2/2009 | Stoitsev et al. |
| 2009/0077217 | A1 | 3/2009 | McFarland et al. |
| 2009/0319418 | A1 | 12/2009 | Herz |
| 2010/0070464 | A1 * | 3/2010 | Aymeloglu ........... G06F 3/0482 715/764 |
| 2010/0162371 | A1 | 6/2010 | Geil |
| 2010/0205616 | A1 | 8/2010 | Lai et al. |
| 2010/0205662 | A1 | 8/2010 | Ibrahim et al. |
| 2010/0235841 | A1 | 9/2010 | Sato |
| 2010/0325097 | A1 * | 12/2010 | Er ......................... G06F 21/629 715/810 |
| 2011/0041084 | A1 | 2/2011 | Karam |
| 2011/0153592 | A1 | 6/2011 | DeMarcken |
| 2011/0185401 | A1 | 7/2011 | Bak et al. |
| 2012/0060162 | A1 | 3/2012 | Hunt et al. |
| 2012/0101952 | A1 | 4/2012 | Raleigh et al. |
| 2012/0151272 | A1 | 6/2012 | Behrendt et al. |
| 2012/0203587 | A1 * | 8/2012 | Bohm .................. G06Q 10/103 705/7.12 |
| 2012/0290506 | A1 | 11/2012 | Muramatsu et al. |
| 2012/0331472 | A1 | 12/2012 | Moon et al. |
| 2013/0036346 | A1 | 2/2013 | Cicerone |
| 2013/0231862 | A1 | 9/2013 | Delling et al. |
| 2013/0286601 | A1 | 10/2013 | Shin et al. |
| 2014/0081685 | A1 | 3/2014 | Thacker et al. |
| 2014/0129942 | A1 * | 5/2014 | Rathod ............ H04N 21/44226 715/720 |
| 2014/0181833 | A1 | 6/2014 | Bird et al. |
| 2014/0237354 | A1 | 8/2014 | Burr et al. |
| 2014/0282177 | A1 | 9/2014 | Wang et al. |
| 2015/0046407 | A1 * | 2/2015 | Kalas .................. G06F 16/1794 707/691 |
| 2015/0120176 | A1 | 4/2015 | Curtis et al. |
| 2015/0127412 | A1 | 5/2015 | Kothandaraman et al. |
| 2015/0261817 | A1 | 9/2015 | Harris et al. |
| 2015/0370540 | A1 * | 12/2015 | Coslovi ............. G06Q 10/0633 717/121 |
| 2016/0063421 | A1 | 3/2016 | Singh et al. |
| 2016/0105409 | A1 * | 4/2016 | Torman ................. H04L 63/20 726/6 |
| 2016/0147730 | A1 | 5/2016 | Cicerone |

FOREIGN PATENT DOCUMENTS

| | | | |
|---|---|---|---|
| EP | 1926074 | A1 | 5/2008 |
| EP | 2555126 | A2 | 2/2013 |
| EP | 2876587 | A1 | 5/2015 |
| EP | 3093809 | A1 | 11/2016 |
| EP | 3188006 | A1 | 7/2017 |
| WO | WO-2012025915 | A1 | 3/2012 |

OTHER PUBLICATIONS

"U.S. Appl. No. 15/800,856, First Action Interview—Pre-Interview Communication mailed Oct. 7, 2019".

"U.S. Appl. No. 15/800,856, Notice of Allowance mailed Jul. 14, 2020", 8 pgs.

"U.S. Appl. No. 15/800,856, Response filed Apr. 1, 2020 to First Action Interview—Office Action Summary mailed Jan. 31, 2020", 12 pgs.

"Help File for ModelRisk Version 5—Part 1", Vose Software, (2007), 375 pgs.

"Help File for ModelRisk Version 5—Part 2", Vose Software, (2007), 362 pgs.

Ashraf, "Protect your Google Account (Gmail) by enabling SMS (text message) notifications for Suspicious Activity", online article from Jan. 24, 2013. https://dottech.org/94405/how-to-setup-text-message-sms-google-notifications-for-suspicious-activity/ (Jan. 24, 2013) 4 pgs.

Ballesteros, Francisco, et al., "Batching: A Design Pattern for Efficient and Flexible Client/Server Interaction", Transaction on Pattern Language of Programming I, (c) Springer-Verlag Berlin Heidelberg 2009, (2009), 48-66.

Bogle, Phillip, et al., "Reducing Cross-Domain Call Overhead Using Batched Futures", SIGPLAN No. 29, 10, OOPSLA '94, (Oct. 1994), 341-354.

Chen, Chia-Ying, et al., "A Novel Emergency Vehicle Dispatching System", 2013 IEEE 77th Vehicular Technology Conference, IEEE, (Jun. 2, 2013), 5 pgs.

Eklund, Peter W., et al., "A Dynamic Multi-source Dijkstra's Algorithm for Vehicle Routing", Intelligent Information Systems, (1996), 5 pgs.

Hart, Peter E., et al., "A Formal Basis for the Heuristic Determination of Minimum Cost Paths", IEEE Transactions on Systems Science and Cybernetics, IEEE, vol. 1, No. 2, (Jul. 1968), 100-107.

Jotshi, Arun, et al., "Dispatching and Routing of Emergency Vehicles in Disaster Mitigation Using Data Fusion", Socio-Economic Planning Sciences, Pergamon, Amsterdam, Netherlands, vol. 43, No. 1, (Mar. 1, 2009), 24 pgs.

(56) References Cited

OTHER PUBLICATIONS

Mohring, Rolf H., "Partitioning Graphs to Speedup Dijkstra's Algorithm", ACM Journal of Experimental Algorithmics, Association of Computing Machinery, New York, New York, vol. 11, (Jan. 1, 2006), 29 pgs.

Reedy, Sarah, "Policy and Charging Rules Function (PCRF)", http://www.lightreading.com/document.asp?doc_id=680015 printed Dec. 10, 2013, (Sep. 13, 2010), 4 pgs.

Stamos, James, et al., "Remote Evaluation", ACM Transactions on Programming Languages and Systems, vol. 12, No. 4, (Oct. 1990), 537-565.

Wagner, Dorothea, et al., "Dynamic Shortest Paths Containers", Electronic Notes in Theoretical Computer Science, vol. 92, No. 1, (2003), 19 pgs.

Yang, Shu, "An Enhanced Routing Method with Dijkstra Algorithm and AHP Analysis in GIS-based Emergency Plan", Geoinformatics, 2010 18th International Conference on, IEEE, Piscataway, New Jersey, (Jun. 18, 2010), 6 pgs.

\* cited by examiner

FIG. 8

SYSTEM TO MANAGE DOCUMENT WORKFLOWS

PRIORITY APPLICATION

This application is a continuation of U.S. patent application Ser. No. 17/063,993, filed Oct. 6, 2020, now U.S. Pat. No. 11,928,164, which is a continuation of U.S. patent application Ser. No. 15/800,856, filed Nov. 1, 2017, now U.S. Pat. No. 10,839,022, which claims priority to U.S. Provisional Application Ser. No. 62/536,298, filed Jul. 24, 2017, the disclosures of which are incorporated herein in their entireties by reference.

TECHNICAL FIELD

The subject matter disclosed herein generally relates to the creation and management of data-objects. Specifically, the present disclosure addresses systems and methods for data-object distribution and management.

BACKGROUND

Data processing systems can be used to facilitate the creation and management of virtual documents and other data-objects through networked systems. While such systems do provide significant advantages over traditional methods of document management, limited scalability prevents existing procedures related to the approval and distribution of documents to be readily updated or maintained. A system which enables administrators to define and manage workflows of data-objects based on properties of those data-objects, would therefore prove to be an improvement in the relevant technical field.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 8 is an interface diagram illustrating a portion of a graphical user interface for managing a data-object based on a defined workflow, consistent with some embodiments.

DETAILED DESCRIPTION

Figure 1:
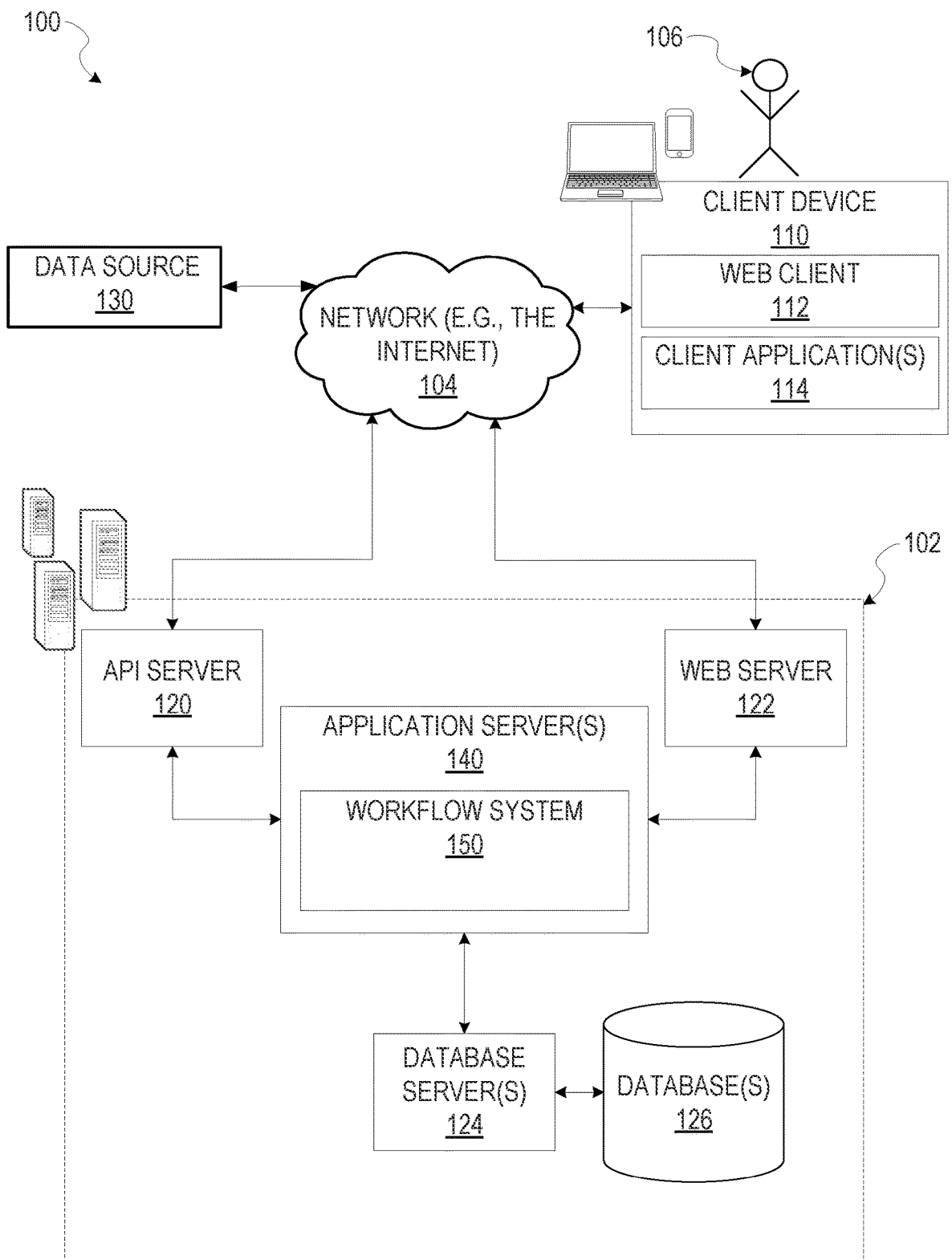
FIG. 1 is a network diagram depicting a network system comprising a group of application servers in communication with a network-based workflow system configured for defining a workflow and managing data-objects based on the defined workflow, consistent with some embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments relate to a network-based workflow system, employed for receiving a workflow definition at a server, assigning the workflow definition to data-object types, generating presentations of data-objects, and causing display of the presentations of the data-objects at client devices, wherein the presentations are based on a data-object state. As used herein, a "workflow" refers to orchestrated and repeatable patterns enabled by a systematic organization of resources into processes that transform and modify presentations of data-objects based on corresponding data-object states. A workflow may therefore comprise a set of states (e.g., data-object states), wherein each state is linked to another state by one or more transitions, and wherein the transitions are associated with a set of user actions which may be performed upon the data-object at each state. A data-object state may therefore be described as a medium to store presentation configuration for a data-object, wherein the presentation configuration comprises a set of instructions to cause a client device to generate and cause display of a presentation of the data-object based on factors including user attributes and device attributes.

Examples of "data-object states" may include at least a "draft" state, a "pending-approval" state, and an "approved." Each state among the data-object states includes an associated set of user actions performable by a user upon the data-object in the state, as well as a presentation configuration that includes display/presentation instructions for a client device to display the data-object. The workflow system may determine an appropriate data-object state for a presentation of a data-object at a client device based on factors including attributes of the client device, attributes of a user associated with the client device, as well as properties of the data-object itself. Each data-object state may additionally include access controls to define user actions which may be performed by a requesting user, based on user attributes and devices attributes of the user, and in some embodiments, based on properties of the data-object itself.

For example, a first user displaying a presentation of the data-object in the draft state may only be able to perform a portion of the user actions available, while a second user displaying a presentation of the data-object in the draft state may be able to perform the full set of user actions available (or a different portion), based on user attributes and device attributes associated with the first user and the second user.

A workflow system may receive a workflow definition from an administrator of the workflow system, wherein the workflow definition comprises a set of data-object states, and an indication of one or more data-object types in which to assign the workflow definition. Data-objects assigned the workflow definition may thereby be managed and distributed in a networked system based on the set of data-object states. As stated above, the workflow definition may include access controls defining user actions performable by users accessing the data-object at the data-object state, wherein the access controls comprise a set of user attributes or device attributes corresponding to user actions performable at each of the data-object states. In such embodiments, user accessing the data-object at a data-object state may be presented with a presentation of a set of user actions, wherein the user actions are based on user attributes and device attributes of the user. For example, the user may be presented with a different set of user actions based on associated user attributes (e.g., username, location data) in the data-object state.

A data-object state comprises a set of user actions that may be performed by a user at the data-object state, as well as a set of transitions. Each transition among the set of transitions indicates a relationship between a source state and a target state, based on a user action performed on the data-object in the data-object state. For example, a data-object in a "first" data-object state may have a "first" set of user actions which may be performed by a user (e.g., edit, share, approve, deny), wherein each user action may result in a transition to another data-object state (e.g., a "second" data-object state). For clarification, in this context, the term "first" is used merely as an identifier of a particular data-object state from among the set of data-object states, and does not necessarily imply a sequence or ordering of the data-object state among the set of data-object states.

The transitions may include self-referential "internal" transitions, wherein the user action may not necessitate a change to another subsequent data-object state, but may instead include a change to the data-object itself in its initial state (e.g., the first state), as well as entry and exit action which may be executed at a given state, and result in a transition to another state. The user actions (e.g., entry and exit actions) available to a user at any given data-object state may be based on access controls. For example, a user may only have access to a portion of the set of user actions based on associated user and device attributes of the user.

In some example embodiments, the workflow system may define a data-object type based on a workflow definition. For example, in response to receiving a workflow definition, the workflow system may define a new data-object type, and index the workflow definition at a memory location within a data-object database. The workflow system may thereby retrieve the workflow definition in response to requests for data-objects of the data-object type, in order to manage and distribute the data-object based on the appropriate workflow.

The workflow system may facilitate the generation of data-objects based on user inputs selecting data-object types and data-object properties. For example, the workflow system generates and causes display of a graphical user interface (GUI) at a client device, wherein the GUI includes a data-object generation menu populated with identifiers of data-object types. In some example embodiments, the workflow system may update the data-object generation menu with new data-object types in response to receiving a workflow definition from a client device. For example, a user may provide the workflow system with a workflow definition that includes a new data-object type identifier. In response, the workflow system may define a new data-object type associated with the workflow definition, and update the data-object generation menu to include the data-object type.

Properties of data-objects may include payload data (e.g., type of file associated with the data-object: map data, text data, image data, audio data, video data), as well as metadata including temporal data defining a time in which the data-object was created, location data indicating a location in which the client device requesting the data-object is located, as well as user data indicating a user that requested or is associated with the data-object.

A user may provide the workflow system with a user input selecting a data-object type from among the set of data-object types in the GUI. In response, the workflow system may generate and cause display of subsequent user selectable options based on the data-object type selected. In some example embodiments, the user selectable options may be based on the data-object type as well as user attributes and device attributes.

The workflow system generates a data-object based on user inputs defining properties of the data-object, and assigns a workflow to the data-object based on the data-object type selected by the user. In some example embodiments, the workflow system may select a workflow from among the set of workflows assigned to the data-object based on the properties of the data-object. For example, data-objects that include a map image payload may be assigned an authentication or approval data-object state, wherein the data-object state causes the data-object to be distributed to an authentication device.

Consider an illustrative example from a user perspective. A user of the workflow system provides the workflow system with a workflow definition. For example, the workflow system may cause display of a GUI that includes one or more fields to receive user inputs defining data-object states. The user inputs may define a number of data-object states for a workflow, as well as conditions of each data-object states among the set of data-object states. Conditions may include access controls, assigned users, as well as display configurations. The data-object state conditions indicate how a data-object is displayed at a client device, as well as specific client devices that may receive the data-object.

The user may also provide indications of one or more data-object types to assign the workflow in the workflow definition, or in some embodiments, may specify a new data-object type by providing a new data-object type identifier. In response to receiving the workflow definition, the workflow system indexes and stores the workflow definition at memory locations within a data-object database, based on the data-object types identified by the user, or may create new memory locations for new data-object types.

The user may provide the workflow system with a data-object generation request. In response to receiving the data-object generation request, the workflow system generates and causes display of a data-object configuration interface that includes a presentation of a set of data-object types. The set of data-object types may be retrieved by the workflow system from the data-object database, and may therefore be updated in real-time based on workflow definitions received from users.

The user provides a user input selecting a data-object type from among the set of data-object types, and in response, the workflow system generates and causes display of a data-object configuration interface that includes user selectable options to configure a data-object. The user selectable options displayed are based on the data-object type selected. For example, the user selectable options may include fields to receive user inputs providing data-object payloads based on the data-object type selected (e.g., audio file, video file, text file, map data, etc.). The user may thereby provide user inputs defining properties of the data-object through the data-object configuration interface presented by the workflow system.

The workflow system generates a data-object based on the user inputs, and assigns a workflow to the data-object based on the data-object type selected. In some embodiments, the workflow system selects an initial data-object state for the data-object from among the set of data-object states of the workflow based on properties of the data-object. For example, the user may provide a user input providing a payload to the data-object configuration interface, or the workflow system may determine a location of the user configuring the data-object, or a device attribute associated with a client device of the user. In response to detecting the payload, the user location data, or the device attributes, the workflow system may select and assign a first data-object state to the data-object, wherein the first data-object state causes the data-object to be transmitted to one or more client devices for authentication/approval. In this way, the workflow system may manage and distribute data-objects through a networked system.

FIG. 1 is a network diagram illustrating a network environment 100 suitable for operating a workflow system 150. A networked system 102 provides server-side functionality, via a network 104 (e.g., an intranet, the Internet or a Wide Area Network (WAN)), to one or more clients such as the client device 110, and data source 130. FIG. 1 illustrates a web client 112, client applications 114 executing on respective client device 110.

An Application Program Interface (API) server 120 and a web server 122 are coupled to, and provide programmatic and web interfaces respectively to, one or more application servers 140. The application servers 140 host the workflow system 150. The application servers 140 are, in turn, shown to be coupled to one or more database servers 124 that facilitate access to one or more databases 126.

The workflow system 150 provides functionality to receive workflow definitions from a client device 110, configuration and generation of data-objects, and management of those data-objects through a networked system 102. For example, the workflow system is configured to receive workflow definitions from the client device 110, index and store the workflow definitions within the databases 126, and generate data-objects based on inputs received from the client device 110 as well as a data source 130. The data source may be or include a database (e.g., similar to databases 126).

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the network system 100 to exchange data with the networked system 102 over the network 104.

The client device 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more user interfaces (UIs). The UIs may be specifically associated with a web client 112 (e.g., a browser) or an application 114, executing on the client device 110, and in communication with the presentation platform 102.

Figure 2:
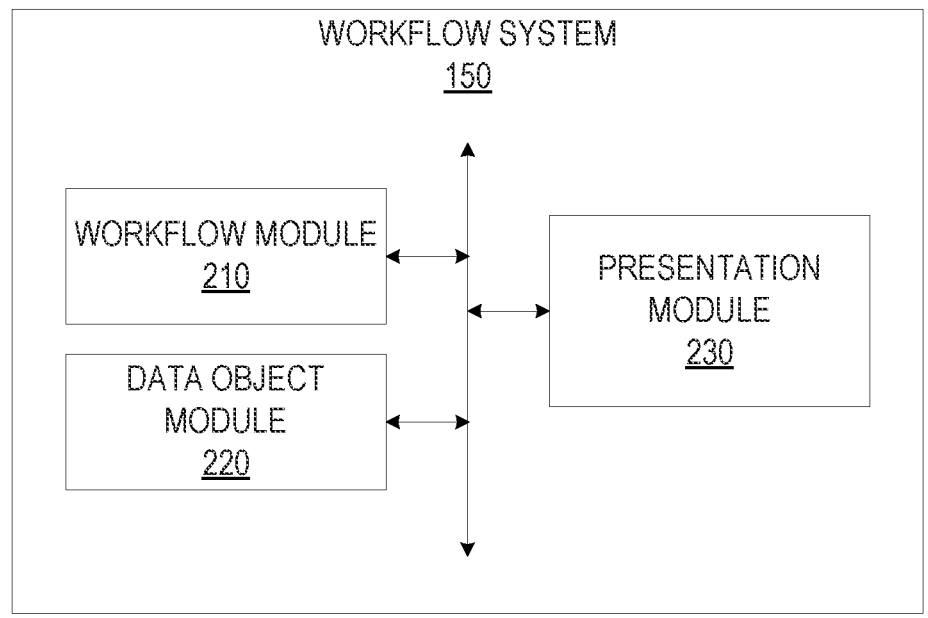
FIG. 2 is a block diagram illustrating various components of the workflow system, which is provided as part of the network system, consistent with some embodiments.

FIG. 2 is a block diagram illustrating an exemplary embodiment of the various components of the workflow system 150, which is provided as part of the network system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the workflow system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the workflow system 150 may be combined into a single module, or subdivided among multiple modules. It shall be appreciated that while the functional components (e.g., modules) of FIG. 2 are discussed in the singular sense, in other embodiments, multiple instances of one or more of the modules may be employed.

The workflow system 150 is shown as including a workflow module 210, a data-object module 220, and a presentation module 230, all configured to communicate with each other (e.g., via a bus, shared memory, a switch, or application programming interfaces (APIs)).

The workflow module 210 facilitates the definition of workflows based on user inputs received from a client device 110. The client device 110 may provide the workflow module 210 with workflow definitions that include a number of data-object states, as well as data-object state conditions of each data-object state. For example, the conditions may include access controls, distribution criteria, display configurations, as well as approval requirements. In some example embodiments, the workflow module 210 may index and store workflow definitions at memory locations within the database 126.

The data-object module 220 receives user inputs defining properties of data-objects generated by the workflow system 150. The data-object module 220 receives user inputs from the client device 110. In response to the user inputs received from the client device 110, the data-object module 220 retrieves workflow definitions from the database 126, based on the user inputs received, and generates and the data-objects based on the appropriate workflow generated by the workflow module 210. For example, a user may provide a user input selecting a data-object type, along with user inputs defining properties of the data-object. In response, the data-object module 220 generates the data-object based on a workflow associated with the corresponding data-object type.

The presentation module 230 receives the data-objects generated by the data-object module 230, and causes display of the data-objects based on the corresponding workflow. For example, the presentation module 230 may cause display of the data-object based on properties of the data-object and the workflow associated with the data-object.

The presentation module 230 also generates and causes display of GUIs at the client device 110. The GUIs include a data-object configuration interface to receive user inputs defining properties of data-objects, as well as various user selectable options to define workflows.

Figure 3:
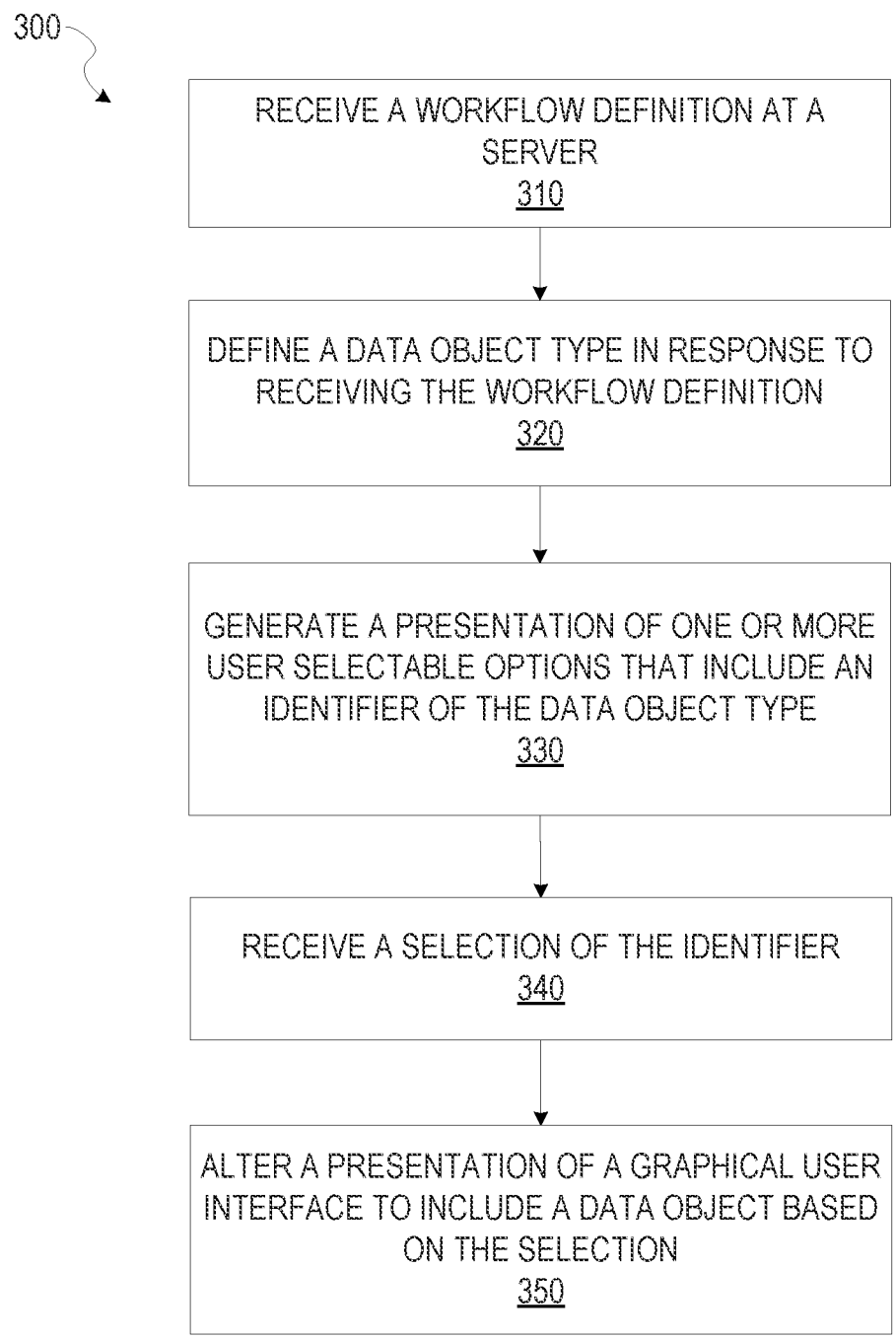
FIG. 3 is a flowchart illustrating a method for generating and managing a data-object based on a defined workflow, according to some example embodiments.

FIG. 3 is a flowchart illustrating a method 300 for generating and managing a data-object based on a defined workflow, according to some example embodiments. The method 300 is embodied in computer-readable instructions for execution by one or more processors such that the operations of the method 300 are performed in part or in whole by the network-based workflow system 150; accordingly, the method 300 is described below by way of example with reference thereto. However, it shall be appreciated that at least some of the operations of the method 300 may be deployed on various other hardware configurations, and the method 300 is not intended to be limited to the network-based workflow system 150.

At operation 310, the workflow module 210 receives a workflow definition from an administrator of the workflow system 150. The workflow definition comprises a set of data-object states, and an indication of one or more data-object types in which to assign the workflow. In some example embodiments, the workflow definition may additionally include a new data-object identifier to define a new data-object type. A data-object state comprises a set of user actions that may be performed by a user at the data-object state, as well as a set of transitions. Each transition among the set of transitions indicates a relationship between a source state and a target state, based on a user action performed on the data-object in the data-object state. In some example embodiments, the workflow definition may include access controls defining user actions performable by users accessing the data-object at the data-object state, wherein the access controls comprise a set of user attributes or device attributes corresponding to user actions performable at each of the data-object states.

At operation 320, the data-object module 220 defines a data-object type based on the workflow definition, in response to receiving the workflow definition. The data-object module 220 indexes and store the workflow definition received by the workflow module 210 at a memory location of the database 126. The memory location may be associated with the one or more data-object types identified in the workflow definition, or in some embodiments may be a new memory location created for a new data-object type. For example, in response to receiving an indication that the workflow definition includes an identifier of a new data-object type, the data-object module 220 may create a new memory location within the database 126.

At operation 330, the presentation module 230 generates and causes display of a graphical user interface (GUI) that includes a data-object configuration interface at the client device 110. For example, the workflow system 150 may receive a data-object configuration request from the client device 110. In response to receiving the data-object configuration request, the presentation module 230 generates and causes display of a data-object configuration interface that includes one or more user selectable options comprising identifiers of data-object types. In some example embodiments, the presentation module 230 may access the database 126 to retrieve identifiers of data-object types.

At operation 340, the data-object module 220 receives a selection of an identifier of a data-object type from among the one or more user selectable options, and at operation 350, the data-object module 220 generates a presentation of the data-object to be displayed within based on the data-object type selected. For example, the data-object module 220 may retrieve a workflow definition associated with the data-object type from the database 126, and generate the data-object based on a data-object state from among the set of data-object states in the corresponding workflow.

At operation 350, the presentation module 230 alters the GUI to include the data-object generated by the data-object module 220, in response to receiving the selection of the identifier of the data-object type.

Figure 4:
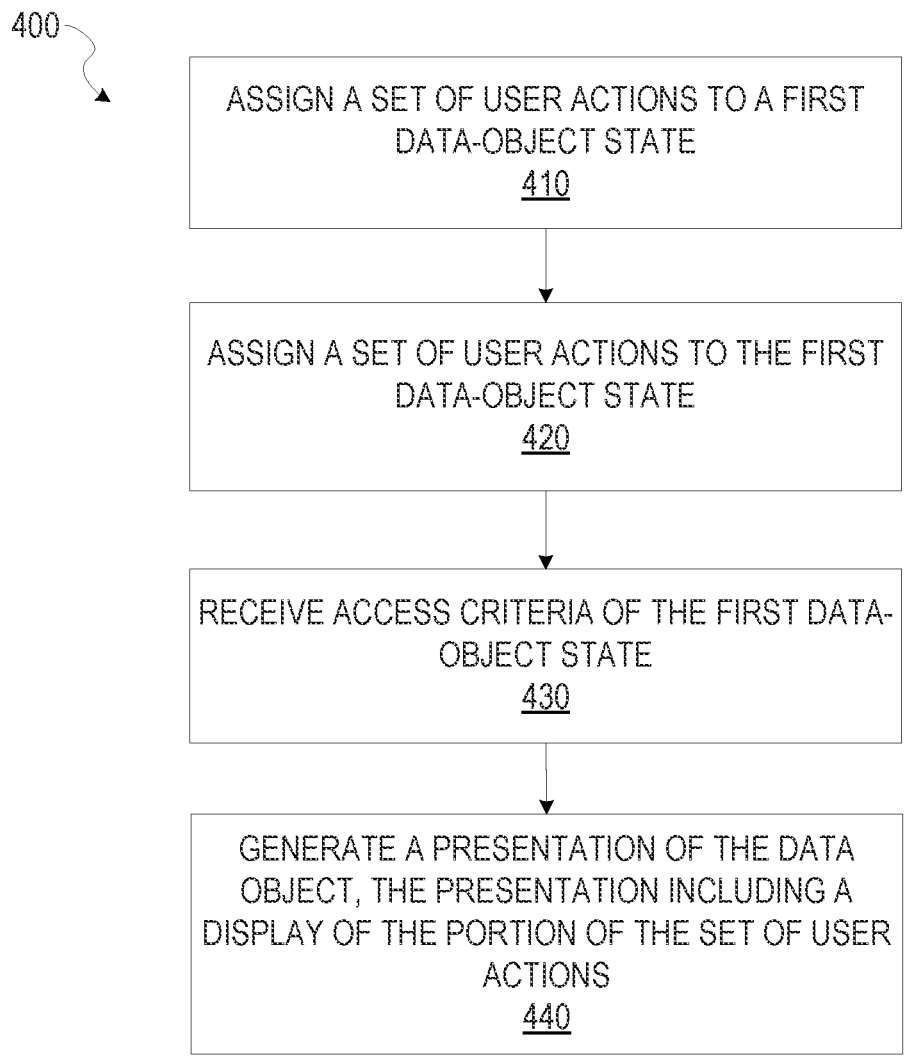
FIG. 4 is a flowchart illustrating a method for generating and managing a data-object based on a defined workflow, according to some example embodiments.

FIG. 4 is a flowchart illustrating a method 400 for generating and managing a data-object based on a defined workflow, according to some example embodiments. One or more operations of the method 400 may be performed as part (e.g., a precursor task, a subroutine, or a portion) of the method 300 of FIG. 3, according to some example embodiments.

At operation 410, the workflow module 210 assigns a set of user actions to a data-object state (e.g., a first data-object state) among the set of data-object states. For example, a user may identify a user action (or set of user actions) by providing user inputs selecting user actions into a GUI that includes a presentation of possible user actions. The user actions may for example include: edit; share; save; delete; duplicate; as well as hide. The user may identify one or more user actions from among the set of user actions, and at operation 420, may provide user inputs to assign the set of user actions to the first data-object state among the set of data-object states. In this context, the term "first" is used merely as an identifier of a particular data-object state from among the set of data-object states, and does not necessarily imply a sequence or ordering of the data-object state among the set of data-object states.

At operation 430, the workflow module 210 receives access controls that include access criteria to assign to the first data-object state. For example, the user may provide a user input specifying user attributes and device attributes for the data-object in the first data-object state. The presentation of the data-object at a client device 110 in the first data-object state is based on the access control. For example, the workflow module 210 may retrieve user attributes and device attributes of a user in response to receiving a request to display the data-object in the first data-object state. At operation 440, the workflow module 210 may compare the user attributes and devices attributes of the user to the access control of the data-object, and cause display of a presentation of the data-object based on the user attributes and device attributes of the user. For example, the workflow module 210 may select a portion of the set of available user actions based on user attributes and device attributes of the user.

Figure 5:
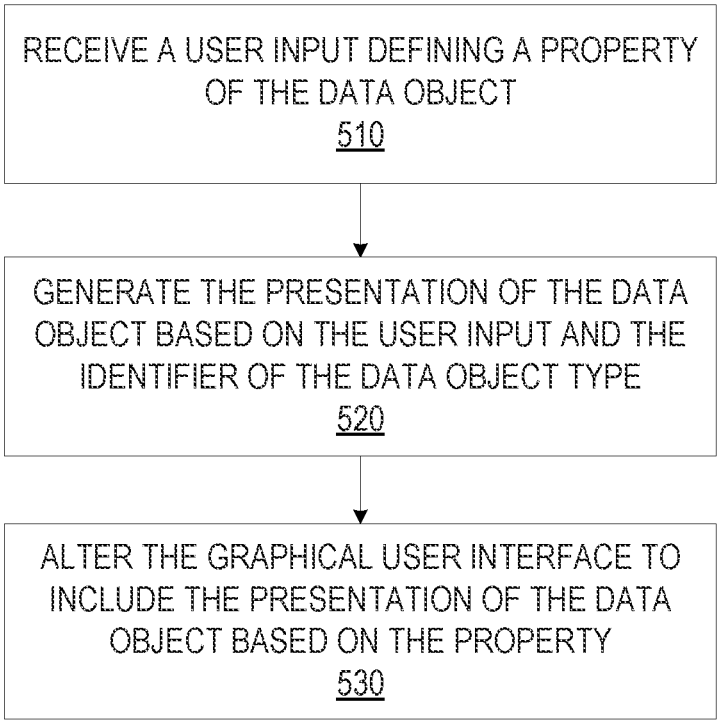
FIG. 5 is a flowchart illustrating a method for generating and managing a data-object based on a defined workflow, according to some example embodiments.

FIG. 5 is a flowchart illustrating a method 500 for generating and managing a data-object based on a defined workflow, according to some example embodiments. One or more operations of the method 500 may be performed as part (e.g., a precursor task, a subroutine, or a portion) of operation 310 of the method 300 of FIG. 3, according to some example embodiments.

At operation 510, the data-object module 220 receives a user input defining a property of a data-object. For example, the data-object module 220 may generate and cause display of a data-object configuration interface in response to receiving a user input selecting a data-object type. The data-object configuration interface may include a presentation of one or more fields to receive user inputs defining properties of a data-object. The property may include a payload (e.g., text data, image data, audio data, map data, video data, etc.), as well as metadata including location data based on a location of a client device of the user, temporal data, and user attributes of the user.

At operation 520, the data-object module 220 generates the presentation of the data-object based on the data-object type selected by the user, as well as the user inputs specifying one or more properties of the data-object. At operation 530, the presentation module 230 alters a presentation of a GUI at the client device 110 to include the data-object based on the properties. For example, the property may comprise image data. In response to detecting the image data, the presentation module 230 may configure the presentation of the data-object to include the image data, in such a way as to optimize the available display real-estate.

Figure 6:
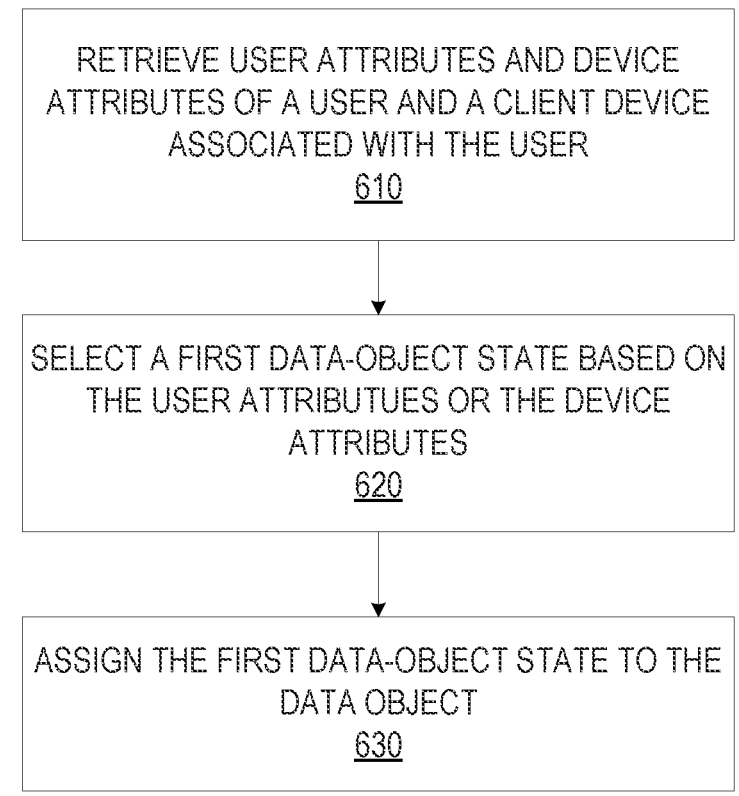
FIG. 6 is a flowchart illustrating a method for generating and managing a data-object based on a defined workflow, according to some example embodiments.

FIG. 6 is a flowchart illustrating a method 600 for generating and managing a data-object based on a defined workflow, according to some example embodiments. One or more operations of the method 600 may be performed as part (e.g., a precursor task, a subroutine, or a portion) of the method 300 of FIG. 3, according to some example embodiments.

At operation 610, the workflow module 210 retrieves user attributes and device attributes of the user 106 and the client device 110. For example, the user 106 may provide a user input to the workflow system 150 requesting the data-object. In response to receiving the request, the workflow module 210 retrieves user attributes and device attributes of the user 106 and the client device 110. The user attributes may include a user identifier, a team identifier, a location identifier, etc. The device attributes may include device type, location data associated with the client device 110, operating system, etc.

At operation 620, the workflow module 210 selection a data-object state (e.g., a first data-object state) from among the set of data-object states associated with the workflow corresponding to the data-object, based on the user attributes and device attributes of the user 106 and the client device 110.

At operation 630, the workflow module assigns the first data-object state to the data-object. Presentation of the data-object at the client device 110 may thereby be based on the first data-object state.

Figure 7:
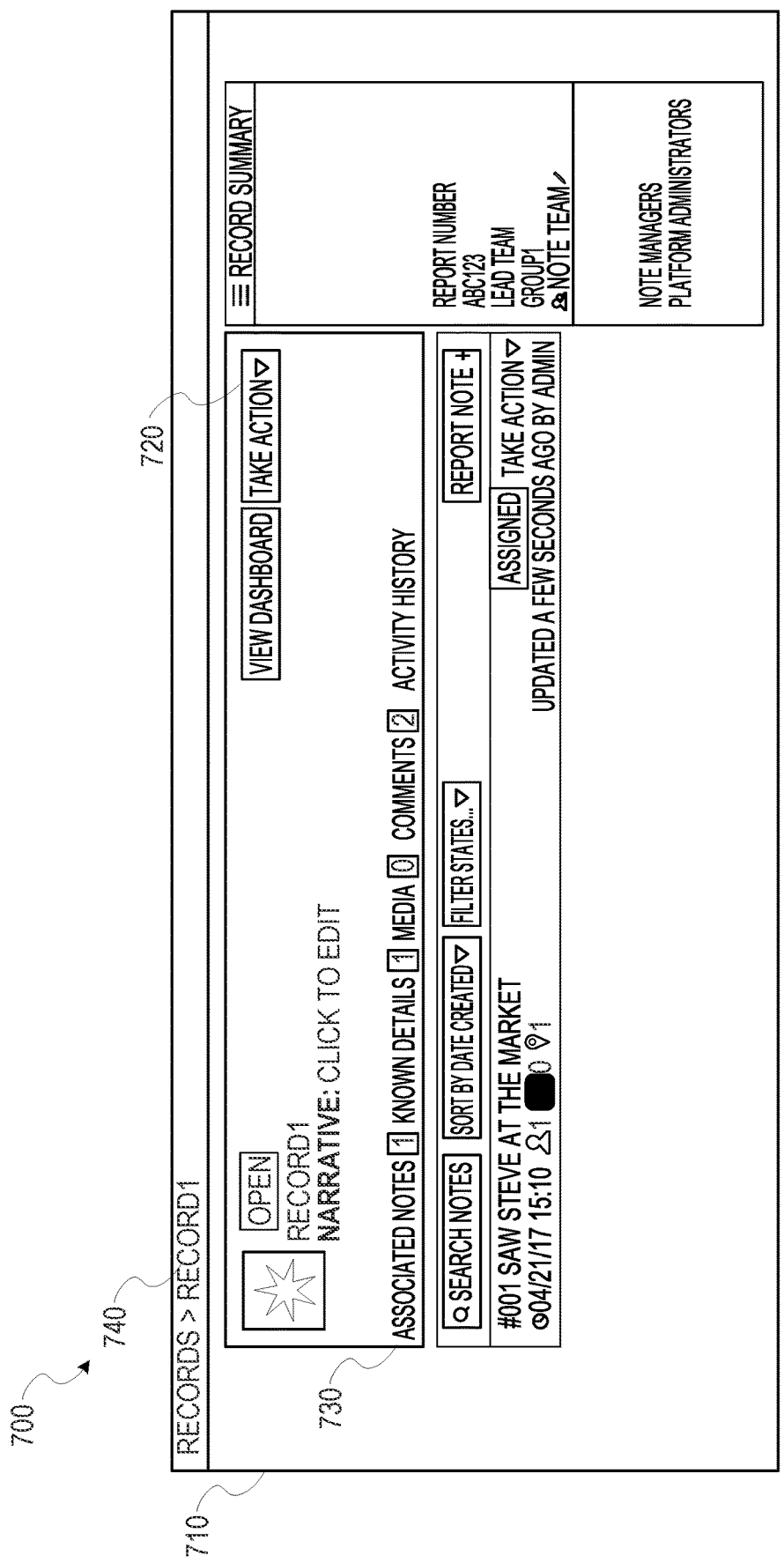
FIG. 7 is an interface diagram illustrating a portion of a graphical user interface for managing a data-object based on a defined workflow, consistent with some embodiments.

FIG. 7 is an interface diagram illustrating a GUI configured to display a tracking interface 600, for displaying graphical windows representative of tracking data accessed and retrieved by the workflow system 150, according to some example embodiments. As shown, the tracking interface 600 includes a set of graphical windows 610, asset identifiers 620, a cursor 630, and tracking data information 640.

The tracking interface 600 may be presented by the presentation module 230 according to methodologies discussed in reference to FIG. 3. As shown in FIG. 6, the graphical windows 610 include an indication of a data source of the tracking data, an asset identifier of the tracking data, a date or time in which the tracking data corresponding to the asset identifier was last updated, and tracking data information 640. The tracking data information 640 may include details surrounding the linked tracking data. For example, as seen in FIG. 6, tracking data information 640 includes a display of a location corresponding to the tracking data, a type of activity documented by the tracking data, associates identified within the tracking data, and a direction of travel from the location (e.g., arrival, departure, southbound, etc.).

As shown in FIG. 6, the tracking interface 600 includes an analysis icon 650. The analysis icon 650 is configured to receive a user input (e.g., via a selection of the analysis icon 650 by the cursor 630), and in response to receiving the user input, causing the visualization module 240 to provide display of a visualization of the tracking data associated with the graphical window of the corresponding analysis icon 650.

In some instances, a user 106 of the client device 110 may opt to add or remove a graphical window from among the set of graphical windows 610 by selecting (or deselecting) a corresponding asset identifier 620. For example, the user 106 may remove a graphical window by providing a user input to delete an asset identifier from among the set of asset identifier 620 (e.g., selecting an "X" on the asset identifier). Alternatively, to add a graphical window to the tracking interface, the user 106 may provide a user input to add an asset identifier (e.g., selecting the "ADD" icon).

FIG. 7 is an interface diagram illustrating a portion of a GUI 700 for managing a data-object 740 based on a defined workflow, according to the methodologies described in FIGS. 3-6. As shown in FIG. 7, the GUI 700 includes a presentation 710 of a data-object 740, wherein the presentation 710 may be based on access controls, user attributes, device attributes, as well as a data-object state. The presentation 710 includes a display of a menu 720 comprising user actions that may be performed by a user at a data-object state. For example, a user 106 may provide a user input into the GUI 700, and in response, the workflow system 150 may generate and cause display of a set of user actions based on user attributes and device attributes of the user 106 and the client device 110.

The presentation 710 may also include a display of data-object properties 730, wherein the data-object properties 730 may be presented based on a data-object state of the data-object and the access controls. For example, a portion of the data-object properties may be omitted based on user attributes and device attributes of the user 106 and the client device 110.

Figure 8:
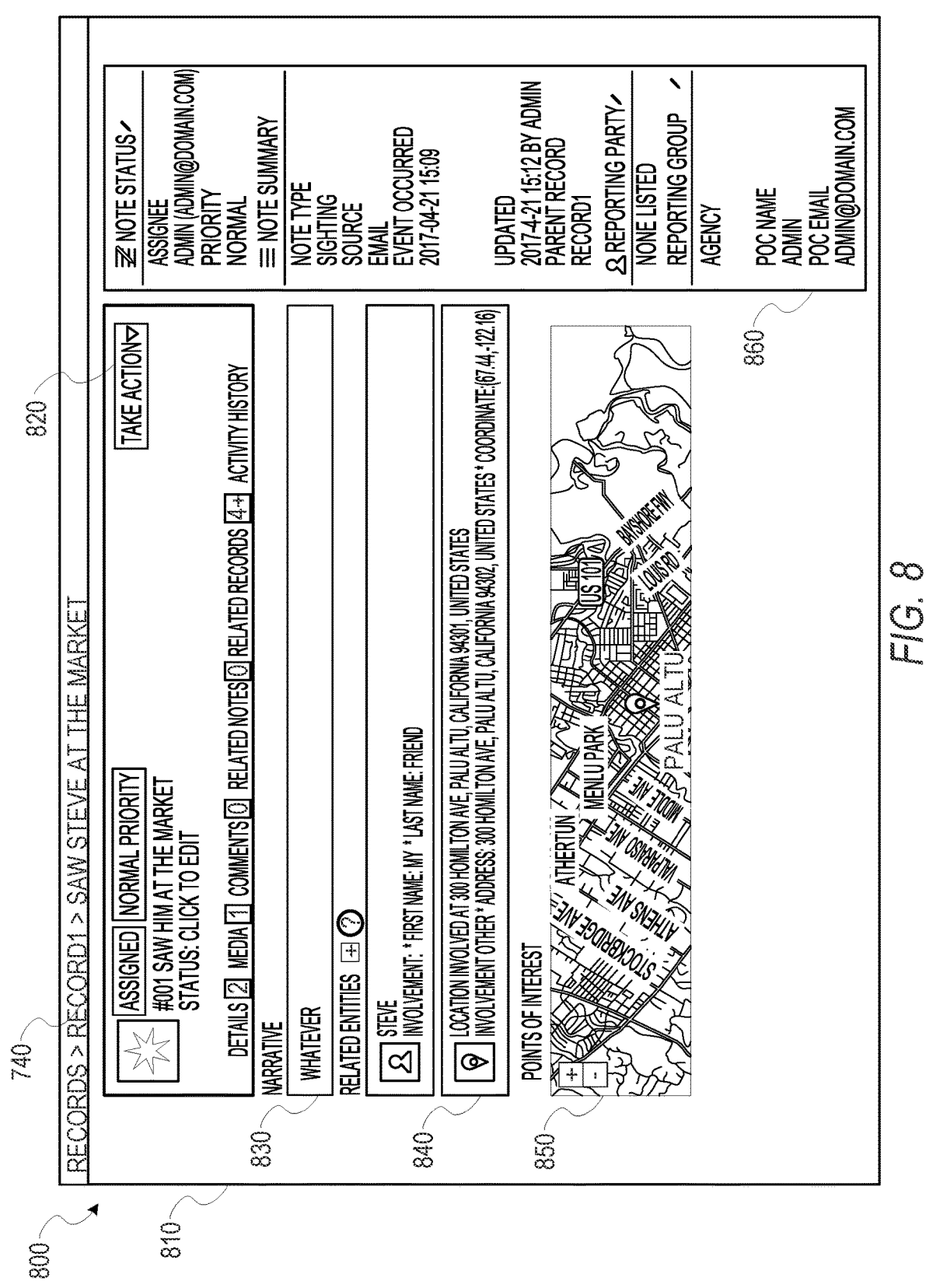

FIG. 8 is an interface diagram illustrating a portion of a GUI 800 for managing the data-object 740 based on a defined workflow, according to the methodologies described in FIGS. 3-6. As shown in FIG. 8, the GUI 800 includes a presentation 810 of the data-object 740, wherein the presentation 810 may be based on access controls, user attributes, device attributes, as well as a data-object state. The presentation 810 includes a display of a menu 820 comprising user actions that may be performed by a user at a data-object state. For example, a user 106 may provide a user input into the GUI 800, and in response, the workflow system 150 may generate and cause display of a set of user actions based on user attributes and device attributes of the user 106 and the client device 110.

As seen in FIG. 8, the presentation 810 may include a display of data-object properties 830, 840, 850, and 860, wherein the display of the data-object properties may be based on access controls and user attributes and device attributes of a requesting user (e.g., user 106 and client device 110). For example, the presentation module 230 may omit or include various data-object properties based on access controls and user attributes and devices attributes of a requesting user, as well as a data-object state of the data-object 740.

Figure 9:
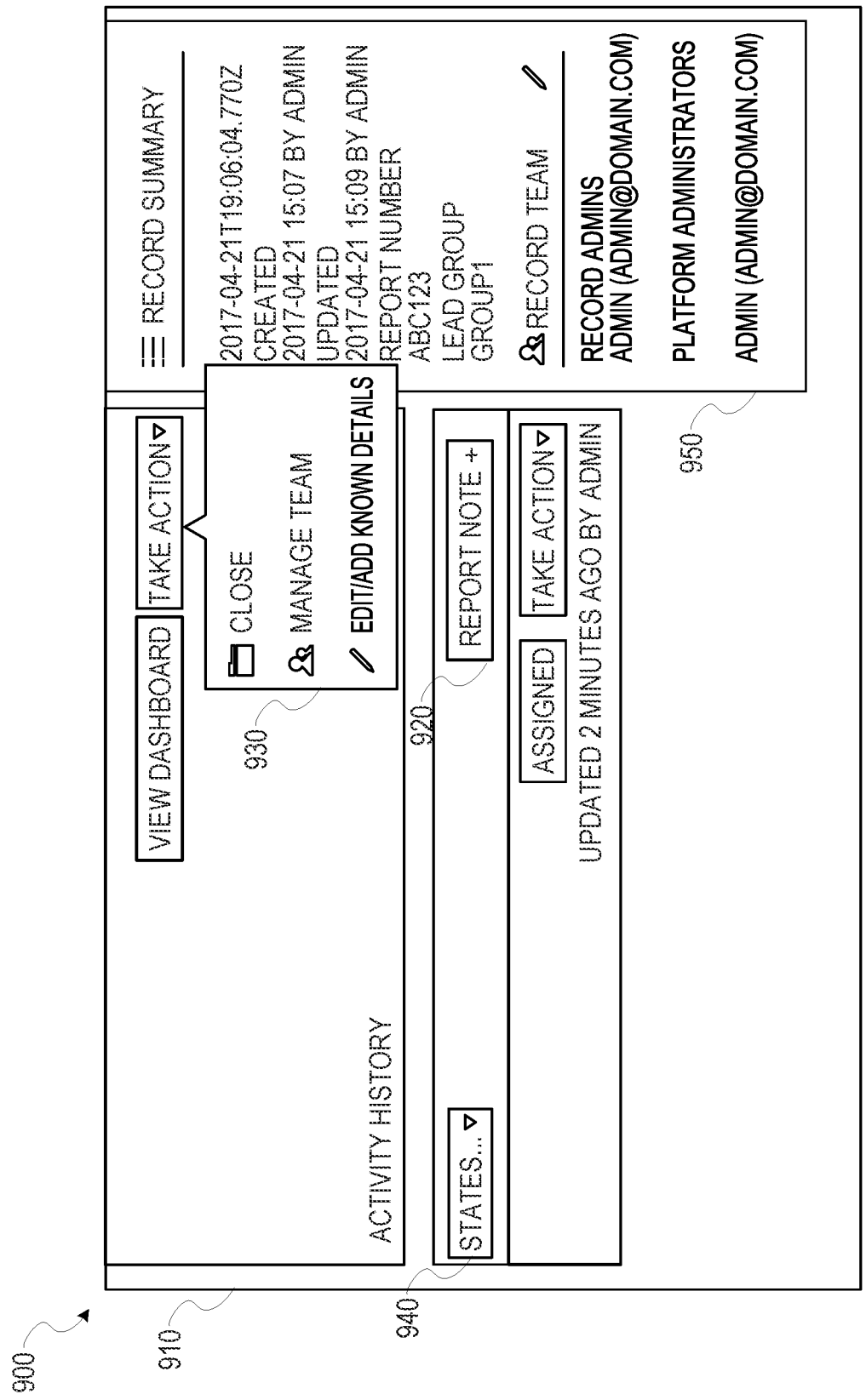
FIG. 9 is an interface diagram illustrating a portion of a graphical user interface for configuring a data-object, consistent with some embodiments.

FIG. 9 is an interface diagram 900 illustrating a portion of a GUI 910 for configuring a data-object 920, consistent with some embodiments. The GUI 910 is shown as including a menu 920 to receive a selection of a data-object type, a menu 930 to present a set of user actions available to a user based on access controls, a menu 940 to display workflows associated with the data-object types, as well as a presentation of data-object properties 950, wherein the data-object properties include personnel, and temporal data.

Figure 10:
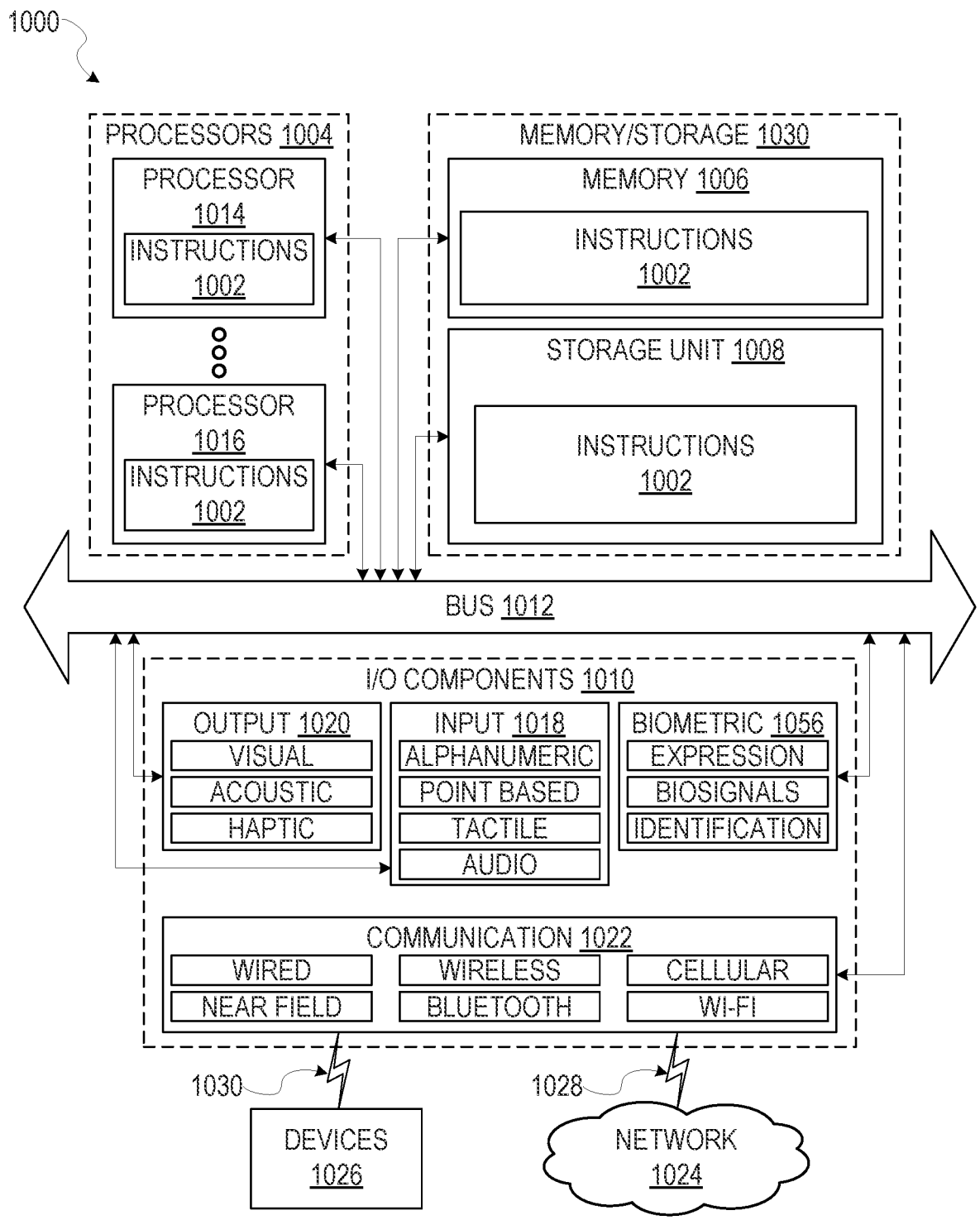
FIG. 10 is a diagrammatic representation of a machine in the example form of a computer system within which a set of instructions for causing the machine to perform any one or more of the methodologies discussed herein may be executed.

FIG. 10 is a diagrammatic representation of a machine in the example form of a computer system within which a set of instructions for causing the machine to perform any one or more of the methodologies discussed herein may be executed. Specifically, FIG. 10 shows a diagrammatic representation of the machine 1000 in the example form of a system, within which instructions 1002 (e.g., software, a program, an application, an applet, an app, a driver, or other executable code) for causing the machine 1000 to perform any one or more of the methodologies discussed herein may be executed. For example, the instructions 1002 include executable code that causes the machine 1000 to execute the methods 400 and 500. In this way, these instructions 1002 transform the general, non-programmed machine into a particular machine programmed to carry out the described and illustrated functions in the manner described herein. The machine 1000 may operate as a standalone device or may be coupled (e.g., networked) to other machines.

By way of non-limiting example, the machine 1000 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1002, sequentially or otherwise, that specify actions to be taken by machine 1000. Further, while only a single machine 1000 is illustrated, the term "machine" shall also be taken to include a collection of machines 1000 that individually or jointly execute the instructions 1002 to perform any one or more of the methodologies discussed herein.

The machine 1000 may include processors 1004, memory 1006, storage unit 1008 and I/O components 1010, which may be configured to communicate with each other such as via a bus 1012. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1014 and processor 1016 that may execute instructions 1002. The term "processor" is intended to include multi-core processors that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1006 (e.g., a main memory or other memory storage) and the storage unit 1008 are both accessible to the processors 1004 such as via the bus 1012. The memory 1006 and the storage unit 1008 store the instructions 1002 embodying any one or more of the methodologies or functions described herein. In some embodiments, the databases 126 resides on the storage unit 1008. The instructions 1002 may also reside, completely or partially, within the memory 1006, within the storage unit 1008, within at least one of the processors 1004 (e.g., within the processor's cache memory), or any suitable combination thereof, during execution thereof by the machine 1000. Accordingly, the memory 1006, the storage unit 1008, and the memory of processors 1004 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 1002. The term "machine-readable medium" shall also be taken to include any medium, or combination of multiple media, that is capable of storing instructions (e.g., instructions 1002) for execution by a machine (e.g., machine 1000), such that the instructions, when executed by one or more processors of the machine 1000 (e.g., processors 1004), cause the machine 1000 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1010 may include a wide variety of components to receive input, provide output, produce output, transmit information, exchange information, capture measurements, and so on. The specific I/O components 1010 that are included in a particular machine will depend on the type of machine. For example, portable machines such as mobile phones will likely include a touch input device or other such input mechanisms, while a headless server machine will likely not include such a touch input device. It will be appreciated that the I/O components 1010 may include many other components that are not specifically shown in FIG. 10. The I/O components 1010 are grouped according to functionality merely for simplifying the following discussion and the grouping is in no way limiting. In various example embodiments, the I/O components 1010 may include input components 1018 and output components 1020. The input components 1018 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1010 may include communication components 1022 operable to couple the machine 1000 to a network 1024 or devices 1026 via coupling 1028 and coupling 1030, respectively. For example, the communication components 1022 may include a network interface component or other suitable device to interface with the network 1024. In further examples, communication components 1022 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1026 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
  receiving a workflow definition from a workflow system;
  assigning a first set of actions performable to a data-object to a first data-object state of a plurality of data-object states, the plurality of data-object states further including a second data-object state associated with a second set of actions performable to the data-object, the first set of actions being different from the second set of actions;
  receiving a request associated with the data-object in the first data-object state;
  causing presentation of a representation of the data-object in the first data-object state on a graphical user interface, the representation of the data-object including at least a part of the first set of actions;
  causing to execute at least one of the part of the first set of actions;
  determining that the data-object is in the second data-object state; and
  altering, based at least in part on the second data-object state, the representation of the data-object, the altered representation of the data-object including at least a part of the second set of actions;
  wherein the method is performed using one or more processors.

2. The method of claim 1, further comprising:
  receiving access criteria associated with the first data-object state;
  retrieving a user attribute based on the request; and
  selecting a subset of the first set of actions based on the access criteria and the user attribute;
  wherein the representation of the data-object includes the subset of the first set of actions.

3. The method of claim 2, further comprising:
retrieving a device attribute based on the request;
wherein the selecting the subset of the first set of actions includes selecting the subset of the first set of actions based on the access criteria, the user attribute, and the device attribute.

4. The method of claim 1, further comprising:
receiving an input indicating a data-object type associated with the data-object; and
selecting a workflow based at least in part on the data-object type.

5. The method of claim 4, further comprising:
retrieving a plurality of workflow definitions from a data repository;
causing a presentation of the plurality of workflow definitions; and
receiving an input associated with the plurality of workflow definitions;
wherein the selecting the workflow includes selecting the workflow based at least in part on the data-object type and the input associated with the plurality of workflow definitions.

6. The method of claim 5, wherein each workflow definition of the plurality of workflow definitions includes a set of respective data-object states.

7. The method of claim 4, further comprising:
generating the data-object based at least in part on the selected workflow and the data-object type.

8. A system comprising:
one or more computer processors;
one or more computer memories; and
a set of instructions stored on the one or more computer memories, the set of instructions when executed by the one or more computer processors, cause the one or more computer processors to perform operations, the operations comprising:
receiving a workflow definition from a workflow system;
assigning a first set of actions performable to a data-object to a first data-object state of a plurality of data-object states, the plurality of data-object states further including a second data-object state associated with a second set of actions performable to the data-object, the first set of actions being different from the second set of actions;
receiving a request associated with the data-object in the first data-object state;
causing presentation of a representation of the data-object in the first data-object state on a graphical user interface, the representation of the data-object including at least a part of the first set of actions;
causing to execute at least one of the part of the first set of actions;
determining that the data-object is in the second data-object state; and
altering, based at least in part on the second data-object state, the representation of the data-object, the altered representation of the data-object including at least a part of the second set of actions.

9. The system of claim 8, wherein the operations further comprise:
receiving access criteria associated with the first data-object state;
retrieving a user attribute based on the request; and
selecting a subset of the first set of actions based on the access criteria and the user attribute;
wherein the representation of the data-object includes the subset of the first set of actions.

10. The system of claim 9, wherein the operations further comprise:
retrieving a device attribute based on the request;
wherein the selecting the subset of the first set of actions includes selecting the subset of the first set of actions based on the access criteria, the user attribute, and the device attribute.

11. The system of claim 8, wherein the operations further comprise:
receiving an input indicating a data-object type associated with the data-object; and
selecting a workflow based at least in part on the data-object type.

12. The system of claim 11, wherein the operations further comprise:
retrieving a plurality of workflow definitions from a data repository;
causing a presentation of the plurality of workflow definitions; and
receiving an input associated with the plurality of workflow definitions;
wherein the selecting the workflow includes selecting the workflow based at least in part on the data-object type and the input associated with the plurality of workflow definitions.

13. The system of claim 12, wherein each workflow definition of the plurality of workflow definitions includes a set of respective data-object states.

14. The system of claim 11, wherein the operations further comprise:
generating the data-object based at least in part on the selected workflow and the data-object type.

15. A non-transitory computer-readable storage medium comprising a set of instructions that, when executed by one or more computer processors, causes the one or more computer processors to perform operations comprising:
receiving a workflow definition from a workflow system;
assigning a first set of actions performable to a data-object to a first data-object state of a plurality of data-object states, the plurality of data-object states further including a second data-object state associated with a second set of actions performable to the data-object, the first set of actions being different from the second set of actions;
receiving a request associated with the data-object in the first data-object state;
causing presentation of a representation of the data-object in the first data-object state on a graphical user interface, the representation of the data-object including at least a part of the first set of actions;
causing to execute at least one of the part of the first set of actions;
determining that the data-object is in the second data-object state; and
altering, based at least in part on the second data-object state, the representation of the data-object, the altered representation of the data-object including at least a part of the second set of actions.

16. The non-transitory computer-readable storage medium of claim 15, wherein the operations further comprise:
receiving access criteria associated with the first data-object state;
retrieving a user attribute based on the request; and selecting a subset of the first set of actions based on the access criteria and the user attribute;
wherein the representation of the data-object includes the subset of the first set of actions.

17. The non-transitory computer-readable storage medium of claim 15, wherein the operations further comprise:
receiving an input indicating a data-object type associated with the data-object; and
selecting a workflow based at least in part on the data-object type.

* * * * *